US008310602B2

(12) United States Patent
Roberts et al.

(10) Patent No.: US 8,310,602 B2
(45) Date of Patent: Nov. 13, 2012

(54) INTERACTIVE REMOTE CONTROL (75) Inventors: Brian F. Roberts, Dallas, TX (US); Donald H. Relyea, Jr., Dallas, TX (US); Greg Johns, Irving, TX (US); Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 783 days.

(21) Appl. No.: 12/336,176

(22) Filed: Dec. 16, 2008

(65) Prior Publication Data

US 2010/0149432 A1    Jun. 17, 2010

(51) Int. Cl.
*H04N 5/44* (2011.01)
*H04N 5/445* (2011.01)
*H04N 7/173* (2011.01)
*H04N 7/16* (2011.01)
*G06F 3/00* (2006.01)
*G06F 13/00* (2006.01)
*G09G 5/00* (2006.01)

(52) U.S. Cl. ............. 348/734; 725/37; 725/39; 725/58; 725/86; 725/135; 345/156

(58) Field of Classification Search .................... None
See application file for complete search history.

(56) References Cited

U.S. PATENT DOCUMENTS

| 2002/0049978 | A1* | 4/2002 | Rodriguez et al. | 725/86 |
| 2003/0172380 | A1* | 9/2003 | Kikinis | 725/39 |
| 2005/0132420 | A1* | 6/2005 | Howard et al. | 725/135 |
| 2006/0164386 | A1* | 7/2006 | Smith et al. | 345/156 |
| 2007/0174869 | A1* | 7/2007 | Kim | 725/37 |
| 2008/0282294 | A1* | 11/2008 | Carpenter et al. | 725/58 |

* cited by examiner

*Primary Examiner* — Jefferey Harold
*Assistant Examiner* — Sean Haiem (57) ABSTRACT

A remote control that includes buttons on the side or bottom may be used to control television viewing provided through a set-top box. In one particular implementation, a method may include receiving, by the set-top box, a signal from the remote control indicating entry to an interactive input mode and receiving another signal from the remote control indicating motion of the remote control. The set-top box may identify an intended command based on the second signal and control television programming in response to the command.

20 Claims, 9 Drawing Sheets

INTERACTIVE REMOTE CONTROL

BACKGROUND INFORMATION

In an increasingly digitally connected world, telecommunication services play a crucial role in the daily operation of businesses and in consumers' lives. Telecommunication services commonly used by both businesses and consumers include telephone, network (e.g., Internet) connectivity, and television. These services are typically provided to the customer premises by a telecommunication provider through one or more wired or wireless connections.

Television, in particular, is one service that may be provided to consumers. Typically, incoming television signals are received by a signal processing device, such as a set-top-box (STB), before being forwarded to the consumer's audio/video equipment (e.g., television). The consumer may control what is watched on the television by controlling the STB through a remote.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein provided for a remote control through which a user may control television viewing that is provided through a STB. The remote control may include a button that puts the remote control into an "interactive" mode. In this mode, the user may control the STB by pointing the remote at the television and moving the remote. In various implementations, the user may, for example, "point and click" to select menu items displayed by the STB, interact with a graphical control or icon displayed by the STB, or use gestures to interact with the STB.

Figure 1:
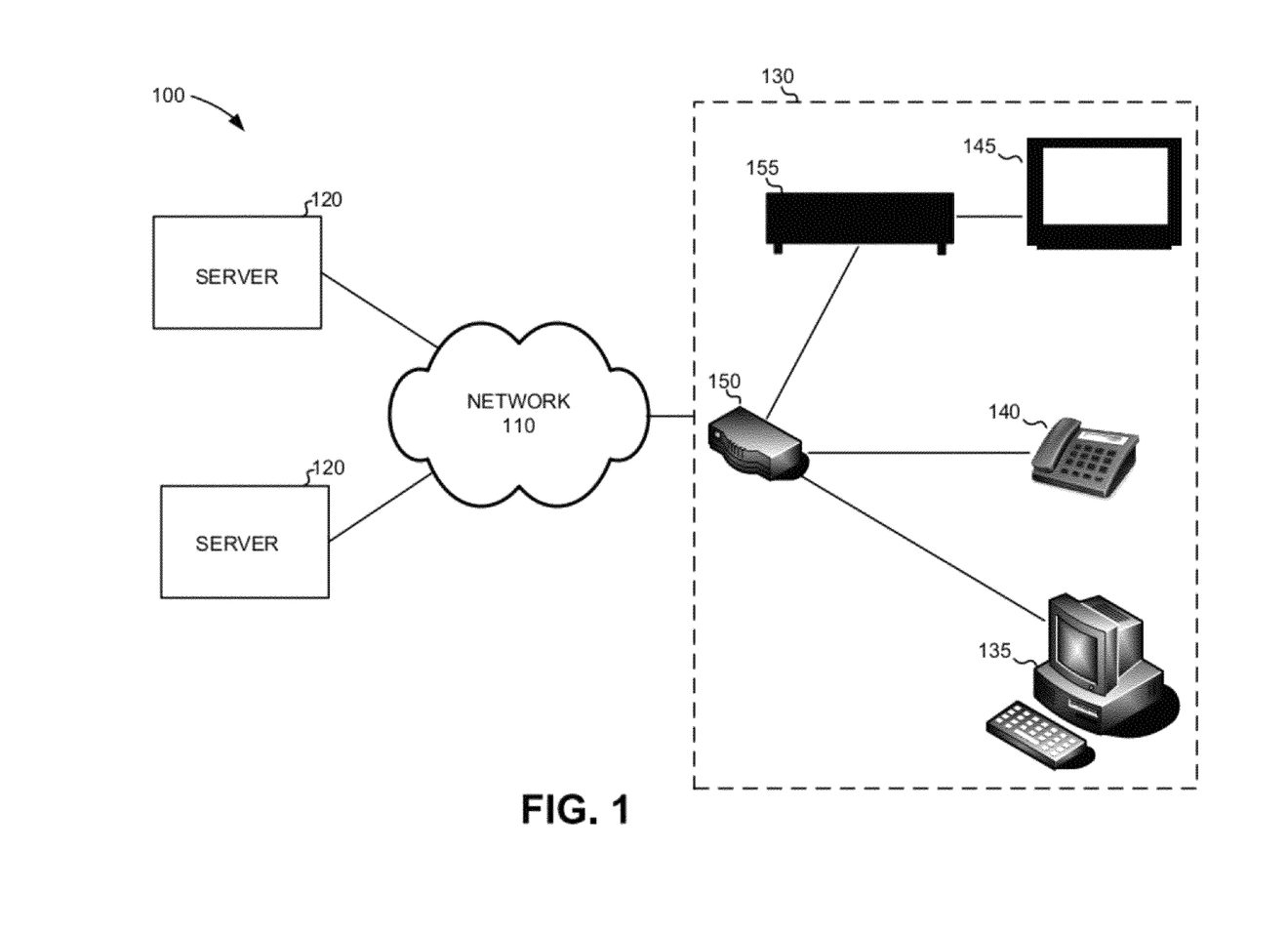
FIG. 1 is a diagram of an exemplary system in which concepts described herein may be implemented.

FIG. 1 is a diagram of an exemplary system 100 in which concepts described herein may be implemented. As illustrated, system 100 may include a network 110 that connects one or more server devices 120 to a consumer/customer premises 130. In general, server devices 120 may provide or control, via network 110, telecommunication services such as telephone, television, and/or network connectivity (e.g., Internet) to customer premises 130.

Network 110 may include a Local Area Network (LAN), a wide area network (WAN), such as a cellular network, a satellite network, a broadcast television based network, the Internet, a private WAN, or a combination of the Internet and a private WAN, that is used to transport data. Although shown as a single element in FIG. 1, network 110 may include a number of separate networks that function to provide services to customer premises 130. In one implementation, network 110 may terminate at customer premises 130 via an optical communication link, such as an optical fiber to the customer premises. In another possible implementation, network 110 may terminate at customer premises 130 via a coaxial cable or other types of wired mechanisms.

Server devices 120 may include servers or other network devices used to deliver or control delivery of the telecommunication services to customer premises 130. For example, server devices 120 may include web servers, network switches or routers, television broadcast facilities. etc.

Customer premises 130 may include a number of electronic devices, such as computing device 135, telephone 140, and television 145. Customer premises 130 may additionally include devices that provide an interface to personal computer 135, telephone 140, and television 145, such as a local gateway 150 and a set-top box (STB) 155.

Computing device 135 may include, for example, a personal computer, such as desktop, laptop computer, personal digital assistant (PDA), etc., used for general computing tasks.

Telephone 140 may include standard analog phones or VoIP (voice over IP) phones. As a VoIP phone, telephone 140 may be a stand-alone telephone capable of initiating VoIP calls over network 110 or a "soft-phone" that is implemented as software on computing device 135.

Television 145 may include a digital or analog television through which a user may watch programming. For example, television 145 may include a high-definition television (HDTV) set. Television 145 may receive audio and video signals from STB 155 present the signals to the user.

Gateway 150 may include a network device that provides an interface from network 110 to personal computer 135, telephone 140, and television 145. For example, when telecommunication services are provided to customer premises 130 via optical fiber, gateway 150 may include an optical network terminal (ONT) to connect to the optical fiber. The ONT may convert between signals appropriate for devices 135/140/145/155 and signals appropriate for transmission over optical fiber. For example, the ONT may include an Ethernet output port that connects to personal computer 135, a standard telephone port for connecting to a standard telephone 140, and/or a coaxial cable that connects to STB 155.

STB 155 may include a device for selecting and/or obtaining content that may be shown or played on television 145. STB 155 may receive a television signal from gateway 150, convert the signal to a form usable by television 145, and transmit the signal to television 145 for display. STB 155 may receive commands, such as commands transmitted via a remote control, and control television 145 accordingly. For example, users may use a remote control to interact with STB 155 and/or television 145 in an interactive session. The interaction of STB 155 with a remote control will be more particularly described below.

In some implementations, STB 155 may include a recording function in which STB 155 may record programs delivered to STB and playback the programs when desired by the user. Additionally, in some implementations, STB 155 may receive programs on-demand (at the selection of the user) from one or more of servers 120.

In general, customer premises 130 may be either a residential or business location. Additionally, although only a single personal computer 135, telephone 140, and television 145 are shown in FIG. 1, it can be appreciated that any particular customer premises 130 may have any number (including none) of any of these devices. Further, although a single customer premises 130 is shown in FIG. 1, servers devices 120 may typically interact with many customer premises.

Figure 2:
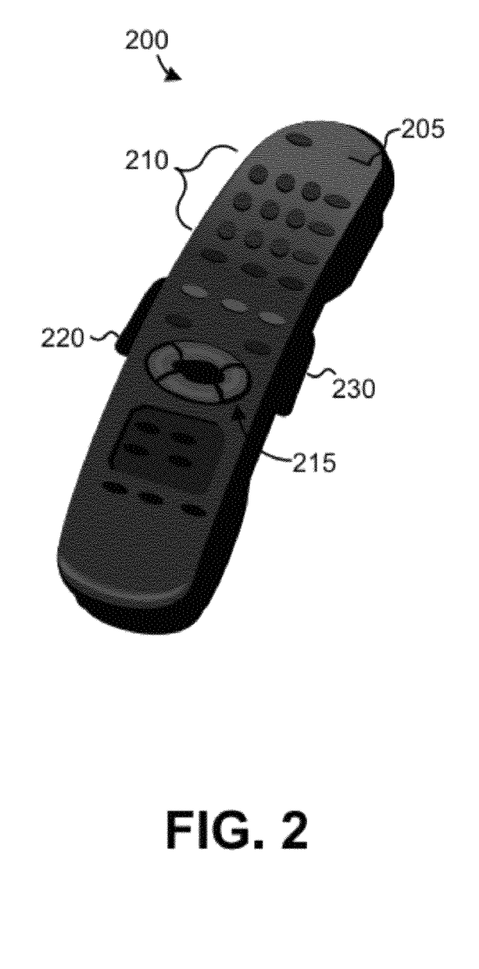
FIG. 2 is diagram illustrating a perspective view of an exemplary remote control.

FIG. 2 is diagram illustrating a perspective view of an exemplary remote control 200. Remote control 200 may be used to control STB 155 to display desired programming, such as television programming, on television 145. Remote control 200 may include a physical housing that supports a number of buttons located on the top portion of the remote control. These buttons will be referred to herein as the "normal buttons" of remote control 200. These buttons may include buttons to turn television 145 and/or STB 155 on or off, buttons to enter channel numbers, and buttons to control the playback of shows recorded by set-top box 155. For example, the buttons may include a power button 205, number buttons 210, and video playback control buttons 215.

The physical housing of remote control 200 may additionally include one or more buttons located on the side or bottom of remote control 200. These buttons may be referred to herein as the "interactive mode buttons" of remote control 200. Two such buttons are shown in FIG. 2, labeled as buttons 220 and 230. Buttons 220 and 230 may be particularly designed as buttons that are easily accessible when remote control 200 is being casually held by the user. For instance, buttons 220 and 230 may be buttons that tend to line up with an adult's fingers when being held in the palm of the hand. Accordingly, the user may not need to particularly look at or concentrate on buttons 220/230 when pushing these buttons.

It can be appreciated that the particular form of remote control 200 is exemplary. Remote control 200 could be implemented in many alternative physical configurations. For example, the interactive mode buttons may be located on the bottom of remote control 200 and there may be one or more than two interactive mode buttons.

Figure 3:
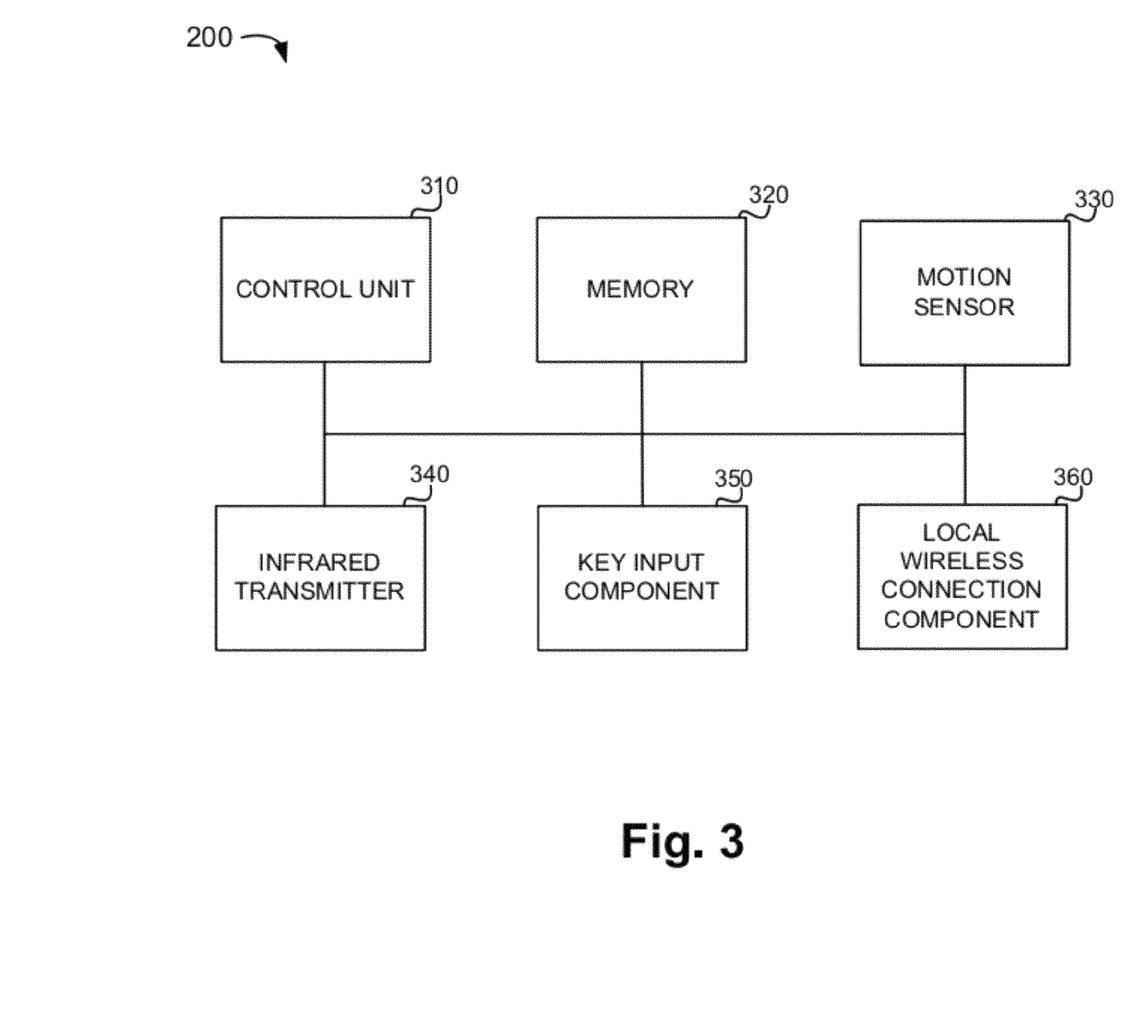
FIG. 3 is a diagram illustrating an exemplary implementation of the remote control shown in FIG. 2.

FIG. 3 is a diagram illustrating an exemplary implementation of remote control 200. Remote control 200 may include a control unit 310, a memory 320, a motion sensor 330, an infrared transmitter 340, a key input component 350, and a local wireless network connection component 360. It will be appreciated that remote control 200 may include additional (or other) components than those illustrated in FIG. 3.

Control unit 310 may include a processor, microprocessor, or other type of processing logic that may interpret and execute instructions. Memory 320 may include a dynamic or static storage device that may store information and instructions for execution by control unit 310. For example, memory 320 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

In some implementations, control unit 310 and memory 320 may be omitted. Instead, remote control 200 may be implemented entirely as a hardwired circuit, i.e., without using control software.

Motion sensor 330 may include one or more components capable of sensing motion of remote control 200. Motion sensor 330 may include an accelerometer and/or a gyrometer.

An accelerometer is a device for measuring acceleration. The accelerometer may be implemented as a circuit that detects acceleration of remote control 200 when it is moved by the user. A gyrometer is a device for measuring tilt. The gyrometer may be implemented as a circuit that detects tilting of remote control 200.

Infrared transmitter 340 may include circuitry for transmitting an infrared signal. The signal may be particularly used to transmit when buttons, such as buttons 205, 210, 230, 220, and 230, on remote control 200 are pushed by the user.

Key input component 350 may be circuitry designed to determine which buttons, such as buttons 205, 210, 230, 220, and 230, have been pressed by the user. An indication of the buttons that have been pressed may be transmitted, via infrared transmitter 340 or local wireless network component 360, to STB 155.

Local wireless connection component 360 may include circuitry designed to implement a local wireless connection. For example, remote control 200 may connect to STB 155 via a Bluetooth connection, IEEE 802.11 ("Wi-Fi") based connection, or another type of connection. The wireless connection implemented by local wireless connection component 360 may generally be relatively short-range connection.

In some implementations, both infrared transmitter 340 and local wireless connection component 360 may be implemented in remote control 200. In other implementations, only one of infrared transmitter 340 or local wireless connection component 360 may be implemented. For instance, local wireless connection component 360 may implement a Bluetooth connection with STB 155, where the Bluetooth connection is used to send information relating to key presses and information generated by motion sensor 330 to STB 155. Alternatively, infrared transmitter 340 may be exclusively used to transmit into to STB 155.

In some implementations, motion sensor 330 may be omitted. In this case, motion of remote control 200 may be estimated by STB based on reception of infrared signals emitted by infrared transmitter 340.

Figure 4:
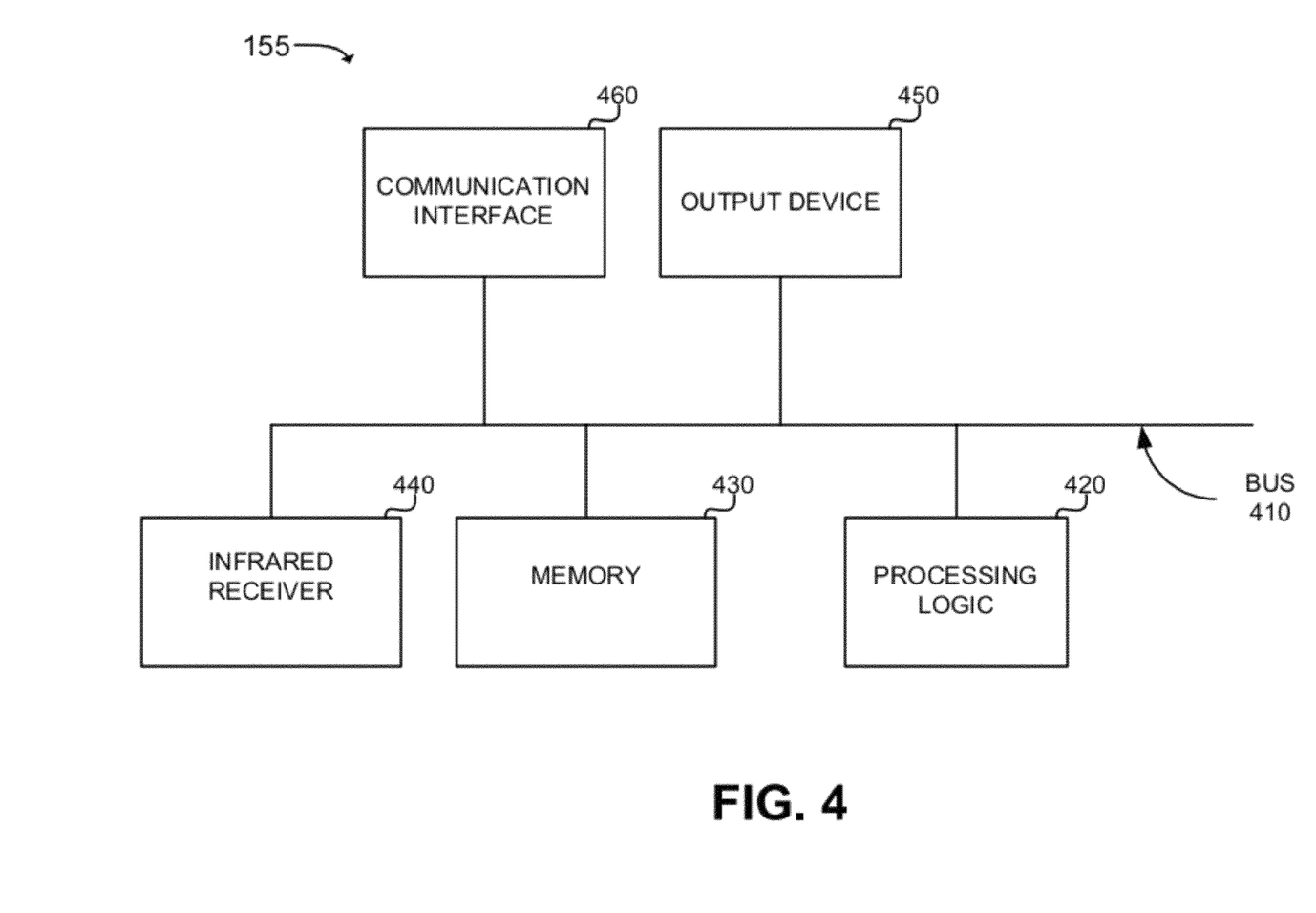
FIG. 4 is a diagram illustrating an exemplary implementation of a set-top box (STB)

FIG. 4 is a diagram illustrating an exemplary implementation of STB 155. As illustrated, STB 155 may include a bus 410, processing logic 420, a memory 430, an infrared receiver 440, an output device 450, and a communication interface 460. It will be appreciated that STB 155 may include additional (or other) components than illustrated in FIG. 4.

Bus 410 may include a path that permits communication among the elements of STB 155. Processing logic 420 may include a processor, microprocessor, or other type of processing logic, such as an application specific integrated circuit (ASIC), field programmable gate array (FPGA), etc., that may interpret and execute instructions. Memory 430 may include a random access memory (RAM) or another type of dynamic storage device that may store information and instructions for execution by processing logic 420, read only memory (ROM) or another type of static storage device that may store static information and instructions for use by processing logic 420, and/or another type of storage device.

Infrared receiver 440 may include circuitry for receiving infrared signals, such as signals transmitted from infrared transmitter 340 of remote control 200. Infrared receiver 440 may receive and decode the input infrared signals to obtain, for example, the key that was pressed by the user. In some implementations, the infrared signals sent from remote control 200 may also be used to indicate when remote control 200 is pointed at STB 155 and may be used to determine movement of remote control 200. For example, infrared sensor 440 may sense the intensity of the received infrared signal, and based on the intensity, estimate the direction that the infrared transmitter in remote control 200 is moving relative to infrared receiver 440. In some implementations, infrared receiver 440 may include multiple, spatially separated, reception circuits, the outputs of which can be used to more accurately determine the motion of remote control 200.

Output device 450 may include one or more ports for outputting information from STB 155. For example, audio and video information may be output to television 145. The signals output to television 145, in addition to including the television signals received from a television provider, may include graphical interface information. For example, STB 155 may display a user guide menu on television 145. The user may interact with the menu using remote control 200 to, for example, select programs to watch or record.

Communication interface 460 may include one or more communication interfaces. For example, communication interface may include an Ethernet interface to through which STB 155 may communicate with gateway 150 to receive programming or other information from servers 120. Communication interface 460 may also include local wireless network transceivers for communicating with local wireless connection component 360 of remote control 200.

As will be described in detail below, STB 155 may perform certain operations. STB 155 may perform these, and other operations, in response to processing logic 420 executing software instructions contained in a computer-readable medium, such as memory 430.

The software instructions may be read into memory 430 from another computer-readable medium or from another device via communication interface 460. The software instructions contained in memory 430 may cause processing logic 420 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 5:
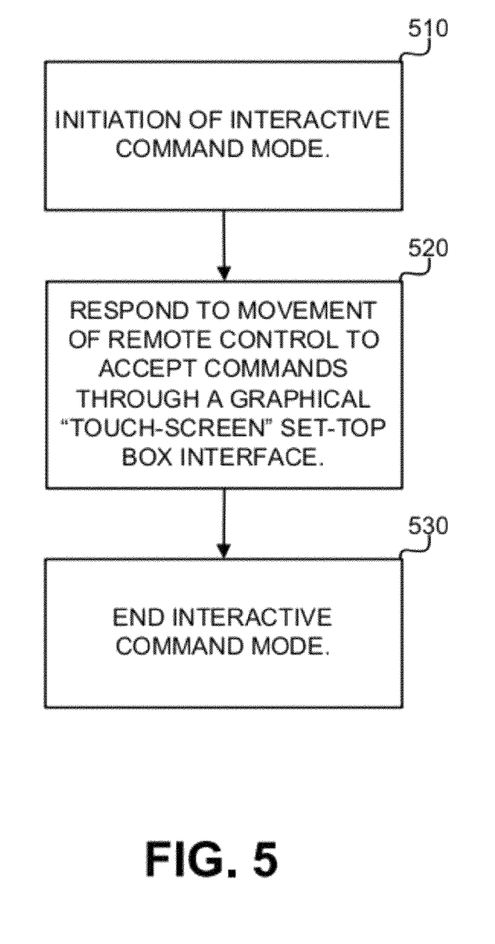
FIG. 5 is a flow chart illustrating exemplary operations for controlling a STB with a remote control.

FIG. 5 is a flow chart illustrating exemplary operations through which a user may interact, through remote control 200, with STB 155.

Remote control 200 may include a "normal" operation mode in which a user may interact with STB 155 and television 145 in a normal remote control sequence, in which, for example, the user may press the normal remote buttons on the top of remote control 200, such as buttons 210 or 215. Each of these keys may correspond to a particular command that is transmitted to STB 155 via infrared transmitter 340.

Additionally, consistent with aspects described herein, an "interactive command mode" may be initiated (block 510) by, for example, pressing one or both of buttons 220 or 230. As previously mentioned, these buttons may be designed as buttons that are easily accessible when remote control 200 is being casually held by the user. The user may thus be able to casually press these buttons without having to be looking at remote control 200.

When in the interactive command mode, remote control 200 and STB 155 may interact so that a touch-screen like interface is presented to the user. STB 155 may respond to movements of remote control 200 to accept commands through the graphical touch-screen interface presented by STB 155 (block 520). More particularly, one or both of buttons 220 and 230, potentially in combinations with the movement of remote control 200, may be used to interact with a visual interface presented by STB 155. The movement of remote control 200 may be detected through, for example, infrared receiver 440 or through motion sensor 330. Examples of the interaction of STB 155 and remote control 200 will be described below.

At some point, the interactive command mode may end (block 530). At this point, STB 155 may go back to a normal command entry mode.

Additionally, details relating to the operation of remote control 200 and STB 155 when in interactive mode will next be described with reference to FIGS. 6-9.

Figure 6:
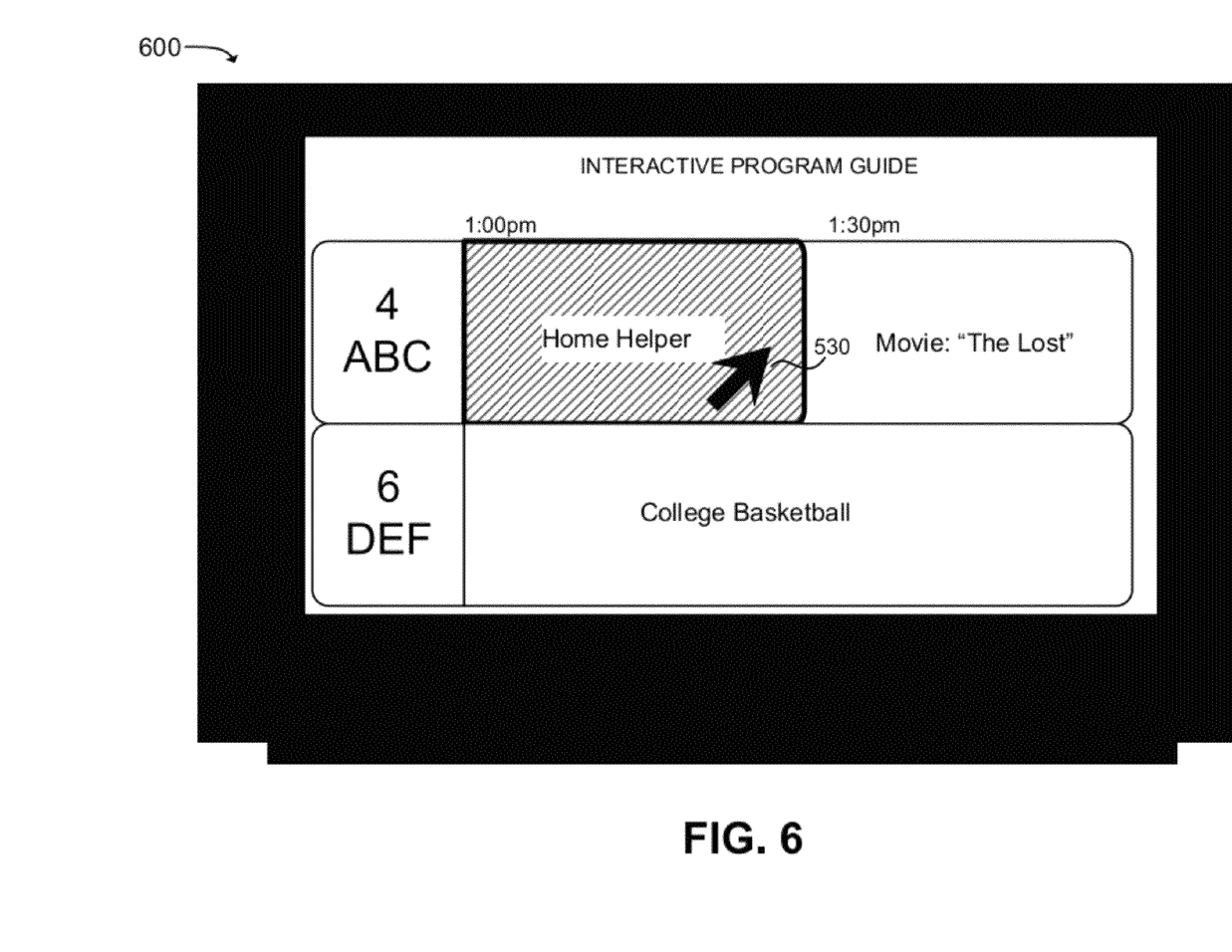
FIG. 6 is a diagram illustrating an exemplary graphical interface for interacting with a STB.

FIG. 6 is a diagram illustrating an exemplary graphical interface 600 for interacting with STB 155. In this example, interface 600 is graphically presented on television 145 by STB 155. Assume that interface 600 is a program guide that displays television programs, times that the programs are broadcast, and the channel associated with the channel. In this example, on channel 4, the program "home helper" is broadcast from 1:00 through 1:30 and the movie "The Lost" is broadcast, beginning at 1:30.

For interface 600, movement of remote control 200 may cause an icon, such as pointer icon 610, to move over interface 600. For example, infrared receiver 440 of STB 155 may include multiple receiver sensors that may be used to translate an infrared signal received from remote control 200 into a signal that represents a direction of movement. STB 155 may then convert this into a location for pointer icon 610 on interface 600.

In one implementation, whenever pointer icon 610 moves over a particular show or channel, the area corresponding to the show or channel may be visually distinguished. In FIG. 6, for instance, the show "home helper" is highlighted. The user may then cause an action to be performed for the highlighted area. For example, one of the interactive mode buttons (e.g., buttons 220 or 230) may be selected to cause STB 155 to tune-in or schedule a recording for that channel. Alternatively, one of the normal mode buttons may be selected, which may cause other actions to be taken for the channel (e.g., block the channel, schedule the channel to be recorded with options, etc.). Alternatively, an action may be specified for the channel based on a gesture made with the remote. For instance, a sharp movement to the right of remote control 200 may cause the channel lineup to advance in time (i.e., display shows later in the day).

Figure 7:
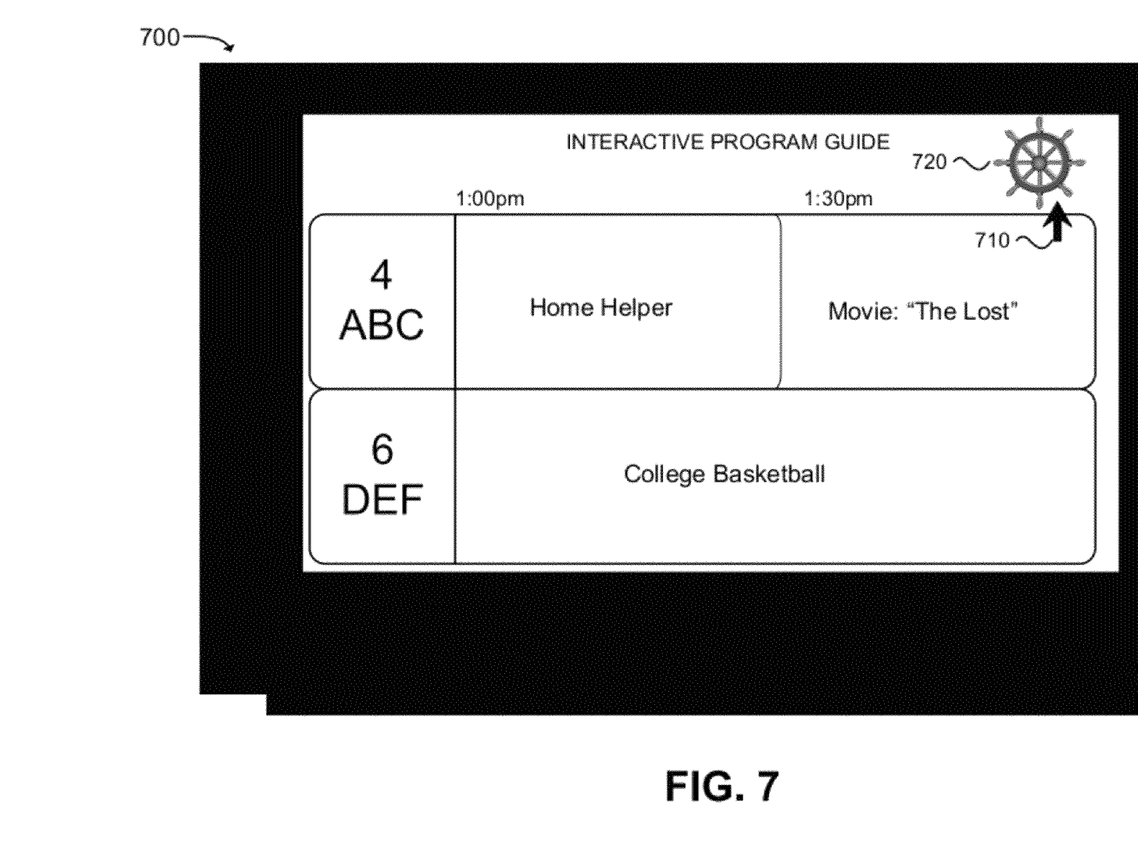
FIG. 7 is a diagram illustrating another exemplary graphical interface for interacting with a STB.

FIG. 7 is a diagram illustrating another exemplary graphical interface 700 for interacting with STB 155 when in an interactive command mode. As with the previous example, the interface may be graphically presented on television 145 by STB 155. Also, assume that interface 700 is a program guide that displays television programs, times that the programs are broadcast, and the channel associated with the channel.

A "wheel" object 720 is included in interface 700. Wheel object 720 may be any graphical object or widget that a user can manipulate through touch-screen like gestures made with remote control 200. For example, one of buttons 220 or 230 may be pressed to cause STB 155 to enter the interactive command mode. The user may then move pointer icon 710 over wheel object 720, press and hold one of buttons 220 or 230 to "grab" the wheel, and then quickly move remote control 200 to spin the wheel either counter-clockwise or clockwise.

In the example of FIG. 7, with pointer icon 710 at the position shown, an upward movement of remote control 200 may cause the wheel to spin counter-clockwise while a downward movement may cause the wheel to spin clockwise. In response, STB 155 may cause the channels shown in the interactive program guide to change based on the direction that the wheel is moved. For example, a clockwise spinning motion may cause the channels to move upward (e.g., channels 7, 8, etc. may be shown) while a counter clockwise spinning motion may cause the channels to move downward (e.g., channels 3, 2, etc. may be shown). In one implementation, the speed with which the user moves remote control 200 to initiate the spinning of wheel object 720 may be related to how fast or far the channels change. Accordingly, a small or slow spin may cause only a few channels to slowly scroll by, while a fast spin may cause the interactive program guide to quickly scroll down many tens of channels. In this way, the user may use remote control 200 to interact with an icon in a touch-screen like manner to control the television viewing experience through STB 155.

It can be appreciated that the wheel object 720 is only one example of a graphical object which a user may interact to control STB 155. In general, such objects may include any widget or media object that the user may interact with and can assist the user in, for example, sorting/stacking, browsing, or otherwise manipulating media information.

Figure 8:
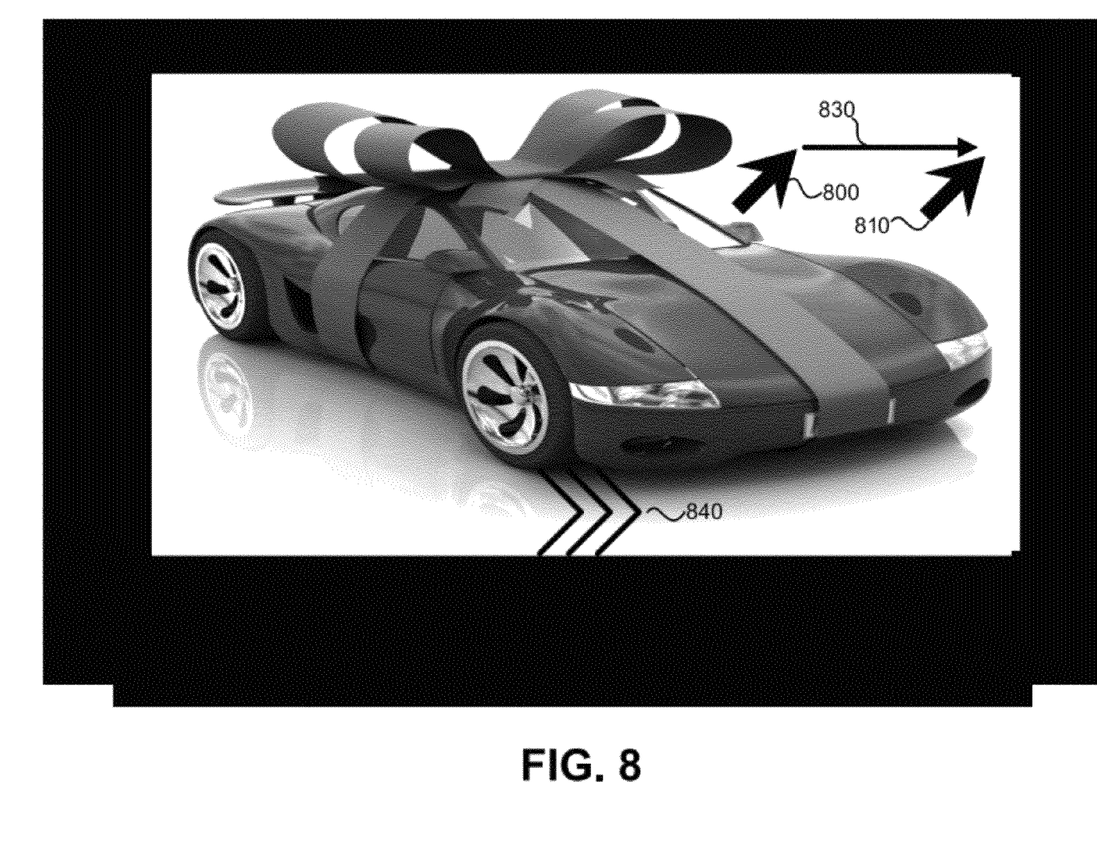
FIGS. 8 and 9 are diagrams illustrating exemplary graphical interfaces through which a user may use gestures to control programming.
Figure 9:
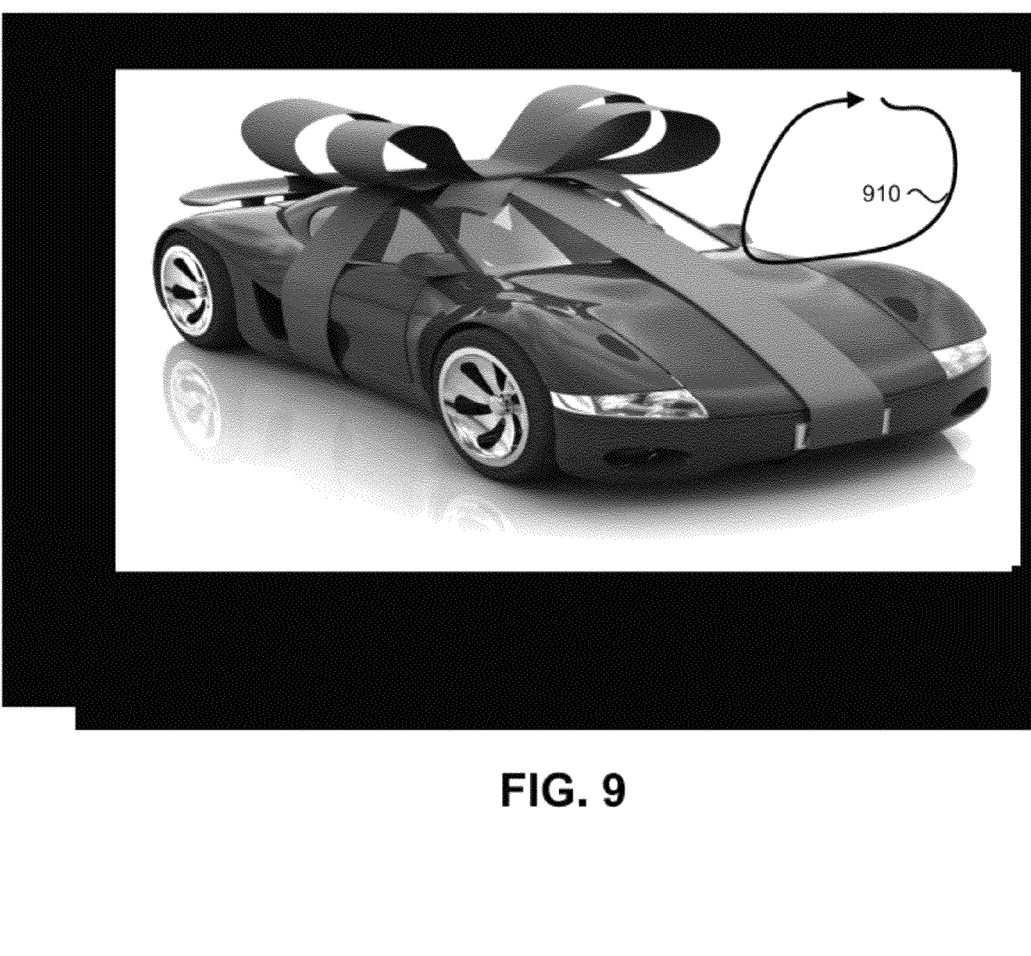

FIGS. 8 and 9 are diagrams illustrating exemplary graphical interfaces through which a user may use gestures to control programming. In this example, assume that a program, such as a television show, is being viewed on television 145. The program is illustrated in FIG. 8 by a picture of a car with a bow wrapped around it.

Assume that the user would like to control an aspect of the playback of the program. For example, STB 155 may provide the ability to pause, rewind, or fast-forward (for non-live programs) the viewing of the program. In this example, the user may use simple gestures to control these commands. For example, the user may press one of buttons 220 or 230 to enter the interactive mode. The user may then, while continuing to hold down the pressed button, move remote control 200 to form a gesture that corresponds to a command. As shown in FIG. 8, for instance, the user may quickly move remote control 200 to the right (illustrated by pointer icons 810 and 820 connected by a line 830). STB 155 may be pre-programmed to have this action correspond to a "fast forward" command, and may begin to fast-forward the program. STB may display a fast-forward icon, such as icon 840, to visually inform that user that STB 155 has been put into fast-forward mode.

FIG. 9 illustrates another exemplary gesture that may be used to control STB 155. As shown, a circular motion 910 may correspond to a particular command. To make this gesture, the user may press one of buttons 220 or 230 to enter the interactive mode, move, while continuing to hold down the pressed button, remote control 200 in a circular motion, and then release the pressed button. The gesture may correspond to, for example, a pause command, a "goto last channel" command, or another command.

As described with respect to FIGS. 8 and 9, the interactive mode of remote control 200 was used to provide simple touch-screen like gesture commands to STB 155 using remote control 200. The user may be able to easily make the gestures while watching television and without having to particularly look at or concentrate on the keypad layout of remote control 200.

Although examples of pausing, rewinding, and fast-forwarding were given for the gestures discussed with respect to FIGS. 8 and 9, it can be appreciated that other commands could be similarly implemented with gestures. Similarly, many other gestures are possible and may be defined by arbitrary movements of remote control 200. In some implementations, the user may be able to customize which gestures correspond to which commands.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks and/or acts have been described with regard to the process illustrated in FIG. 5, the order of the acts and/or blocks may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed:

1. A method comprising:
receiving, by a set-top box, a first signal from a remote control indicating an activation of an interactive input mode associated with the remote control;
receiving, by the set-top box, a second signal, from the remote control, indicating a movement of the remote control,
 receiving the second signal including receiving one or more infrared signals,
 the one or more infrared signals being received using multiple infrared sensors associated with the set-top box;
identifying, by the set-top box and when the interactive input mode is activated, a command for operating the set-top box,
 identifying the command for operating the set-top box including:
  translating the one or more infrared signals, received using the multiple infrared sensors, into information that identifies the movement of the remote control,
  the command being identified based on the information that identifies the movement of the remote control; and
controlling, by the set-top box, television programming, provided by the set-top box, based on the command.

2. The method of claim 1, where the first signal is received based on a user pressing a button on the remote control,
where the button is located on a side or a bottom of the remote control, and
where the second signal is received, after the first signal is received, based on a gesture, of the user with the remote control, that causes the movement of the remote control.

3. The method of claim 1, where identifying the command for operating the set-top box includes:
  identifying the command based on identification of a gesture associated with the movement of the remote control, the infrared signals being associated with the gesture.

4. The method of claim 1, where identifying the command for operating the set-top box includes:
  identifying the command based on identification of a manipulation of a graphical object provided for display by the set-top box as part of the television programming, where the infrared signals are associated with the manipulation of the graphical object.

5. The method of claim 1, where identifying the command for operating the set-top box includes:
  identifying a third signal indicating pressing of a button on the remote control; and
  identifying the command based on the second signal and the third signal, where the command relates to manipulating a graphical interface provided for display by the set-top box.

6. The method of claim 5, where the graphical interface provided for display by the set-top box includes a television programming menu guide, and
  where controlling the television programming includes:
    moving an icon, provided with the television programming menu guide, to select one or more items of the television programming menu guide.

7. A device comprising:
  a receiver to receive signals sent from a remote control, the receiver including multiple infrared reception circuits;
  a communication interface to receive television programming; and
  logic to:
    identify:
      a first signal, of the signals received from the remote control, as corresponding to a button, of the remote control, being pressed, and
      a second signal, of the signals received from the remote control, as corresponding to a movement of the remote control,
      the second signal including one or more infrared signals, corresponding to the movement of the remote control, that are received by the multiple infrared reception circuits,
    implement an interactive input mode for the device based on the first signal corresponding to the button being pressed,
    convert the one or more infrared signals to one or more commands for operating the device to control the television programming when the interactive input mode is implemented, and
    control the television programming based on the one or more commands.

8. The device of claim 7, where the device includes a set-top box,
  where the television programming includes a television programming menu guide provided by the set-top box, and
  where the television programming menu guide is controlled using the one or more commands.

9. The device of claim 7, further comprising:
  an output port to output the television programming to a television.

10. The device of claim 7, where the logic is further to:
  identify the one or more commands based on identification of a gesture associated with the movement of the remote control.

11. The device of claim 7, where the logic is further to:
  identify the one or more commands based on the movement of the remote control corresponding to a manipulation of a graphical object provided for display, by the device, as part of the television programming, and
  manipulate the graphical object based on the one or more commands.

12. A system comprising:
  a device comprising:
    means for receiving a first signal, from a remote control, to initiate an interactive input mode associated with the device;
    means for receiving a second signal from the remote control based on a movement of the remote control, the second signal including one or more infrared signals received by a plurality of infrared sensors associated with the device;
    means for translating, when the interactive input mode of the remote control is initiated, the one or more infrared signals to information identifying the movement of the remote control;
  means for identifying a command for operating the device, based on the information identifying the movement of the remote control; and
  means for controlling television programming based on the command.

13. The system of claim 12, where the device further comprises:
  means for including a graphical interface in the television programming,
  where the command is identified based on the graphical interface, and
  where the graphical interface is controlled based on the command.

14. The system of claim 12, where the first signal is received based on a user pressing a button on the remote control,
  and
  where the second signal is received, after the first signal, based on a gesture, of the user with the remote control, that causes the movement of the remote control.

15. The system of claim 12, where the means for controlling television programming includes:
  means for manipulating a graphical object presented as part of the television programming.

16. The system of claim 12, where the means for controlling television programming includes:
  means for moving an icon, provided with a television programming menu guide of the television programming, to select one or more items of the television programming menu guide.

17. The system of claim 12, where the means for controlling television programming includes at least one of:
  means for moving information identifying channels of a television programming menu guide of the television programming;
  means for fast-forwarding the television programming; or
  means for pausing the television programming.

18. The system of claim 12, where the means for translating the one or more infrared signals to the information identifying the movement of the remote control includes:
  means for sensing an intensity of the one or more infrared signals, the information identifying the movement of the remote control being based on the intensity of the one or more infrared signals.

19. The method of claim 1, where controlling the television programming includes at least one of:

moving information identifying channels of a television programming menu guide of the television programming;
fast-forwarding the television programming; or
pausing the television programming.

20. The device of claim 7, where, when controlling the television programming, the logic is to at least one of:

move information identifying channels of a television programming menu guide of the television programming;
fast-forward the television programming; or
pause the television programming.

\* \* \* \* \*